(12) United States Patent
Hsu et al.

(10) Patent No.: US 11,922,733 B2
(45) Date of Patent: *Mar. 5, 2024

(54) SYSTEM AND METHOD OF ENROLLING USERS OF A WIRELESS BIOMETRIC LOCKSET

(71) Applicant: ASSA ABLOY Americas Residential Inc., New Haven, CT (US)

(72) Inventors: Wei Hsu, Lake Forest, CA (US); Kevin Pasma, Lake Forest, CA (US); Zachary Keoki Hong, Irvine, CA (US); Jason Tu, Mission Viejo, CA (US); Donnie Viajar, Rancho Santa Margarita, CA (US); Ali Atash, Irvine, CA (US); Kevin Coleman, Santa Ana, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/054,793

(22) Filed: Nov. 11, 2022

(65) Prior Publication Data

US 2023/0144744 A1    May 11, 2023

Related U.S. Application Data

(63) Continuation of application No. 17/104,300, filed on Nov. 25, 2020, now Pat. No. 11,501,579.
(Continued)

(51) Int. Cl.
*G06V 40/50*    (2022.01)
*G06F 21/32*    (2013.01)
(Continued)

(52) U.S. Cl.
CPC .............. *G06V 40/50* (2022.01); *G06F 21/32* (2013.01); *G06F 21/35* (2013.01);
(Continued)

(58) Field of Classification Search
CPC .... G06V 40/50; G06V 40/1365; G06V 40/12; G06V 40/67; G06F 21/32; G06F 21/35;
(Continued)

(56) References Cited

U.S. PATENT DOCUMENTS 7,747,043 B2    6/2010    Kamata et al.
7,908,896 B1    3/2011    Olson et al.
(Continued)

FOREIGN PATENT DOCUMENTS

CN    109790727 A    5/2019
CN    110169032 A    8/2019
KR    101433079 B1    8/2014

OTHER PUBLICATIONS

PCT International Search Report and Written Opinion for International Application No. PCT/US2020/062007 dated Mar. 22, 2021.
(Continued)

*Primary Examiner* — Brian E Miller
(74) *Attorney, Agent, or Firm* — Merchant & Gould PC

(57) ABSTRACT

A method of enrolling a user at a biometric lockset is described. The method includes receiving user access information from a mobile device of an administrative user of the biometric lockset. The user access information indicates to the biometric lockset to enter an enrollment mode in which a user identity is associated with fingerprint data in a user entry within a memory of the biometric lockset. A plurality of different light codes are displayed on the lockset, each one of the plurality of light codes representative of a different state of fingerprint data capture. A message is transmitted to the mobile device, and corresponds to the light code displayed at the lockset. The completed fingerprint data is stored in association with the user identity of the user in the user entry.

20 Claims, 12 Drawing Sheets

Related U.S. Application Data

(60) Provisional application No. 62/940,569, filed on Nov. 26, 2019.

(51) Int. Cl.
| | | |
|---|---|---|
| *G06F 21/35* | (2013.01) | |
| *G06V 40/12* | (2022.01) | |
| *G07C 9/00* | (2020.01) | |
| *G07C 9/20* | (2020.01) | |
| *H04W 4/80* | (2018.01) | |

(52) U.S. Cl.
CPC ..... *G06V 40/1365* (2022.01); *G07C 9/00309* (2013.01); *G07C 9/00563* (2013.01); *G07C 9/00817* (2013.01); *G07C 9/215* (2020.01); *H04W 4/80* (2018.02); *G06F 2221/2137* (2013.01); *G07C 2009/00769* (2013.01)

(58) Field of Classification Search
CPC ........ G06F 2221/2137; G07C 9/00309; G07C 9/00563; G07C 9/00817; G07C 9/215; G07C 2009/00769; G07C 2209/02; H04W 4/80
See application file for complete search history.

(56) References Cited

U.S. PATENT DOCUMENTS

| | | | |
|---|---|---|---|
| 9,024,759 B2 | 5/2015 | Uyeda et al. | |
| 9,621,702 B2 | 4/2017 | Shen | |
| 11,036,962 B2 | 6/2021 | Chen et al. | |
| 11,074,772 B2 | 7/2021 | Gnanachandran et al. | |
| 11,094,153 B2 | 8/2021 | Einberg | |
| 11,501,579 B2* | 11/2022 | Hsu | H04W 4/80 |
| 2002/0097142 A1* | 7/2002 | Janiak | G07C 9/38 |
| | | | 340/5.6 |
| 2003/0167396 A1 | 9/2003 | Usui | |
| 2004/0012482 A1 | 1/2004 | Yamagishi | |
| 2005/0286745 A1 | 12/2005 | Kamata et al. | |
| 2007/0247279 A1 | 10/2007 | Safonov | |
| 2008/0060192 A1 | 3/2008 | Manton | |
| 2008/0061927 A1 | 3/2008 | Manton | |
| 2010/0225441 A1* | 9/2010 | Fisher | G07C 9/21 |
| | | | 340/5.83 |
| 2012/0082348 A1 | 4/2012 | Fukuda et al. | |
| 2014/0003679 A1* | 1/2014 | Han | G06V 40/1335 |
| | | | 382/124 |
| 2014/0162598 A1 | 9/2014 | Villa-Real | |
| 2015/0358315 A1 | 12/2015 | Cronin | |
| 2016/0055695 A1 | 2/2016 | Saeedi et al. | |
| 2016/0063298 A1 | 3/2016 | Tuneld et al. | |
| 2016/0321494 A1 | 3/2016 | Shin et al. | |
| 2016/0180618 A1 | 6/2016 | Ho et al. | |
| 2016/0239704 A1 | 8/2016 | Kamada | |
| 2017/0091523 A1 | 3/2017 | Chen et al. | |
| 2017/0098335 A1 | 4/2017 | Payack, Jr. | |
| 2017/0220882 A1* | 8/2017 | Russo | G06V 40/1335 |
| 2017/0287247 A1 | 10/2017 | Saeedi et al. | |
| 2018/0336749 A1 | 11/2018 | Wong | |
| 2019/0080189 A1 | 3/2019 | Van Os et al. | |
| 2019/0213818 A1 | 7/2019 | Einberg | |
| 2019/0311561 A1 | 10/2019 | Saeedi et al. | |
| 2019/0333301 A1 | 10/2019 | Imanuel | |
| 2020/0219345 A1 | 7/2020 | Beck et al. | |
| 2020/0257877 A1 | 8/2020 | Siu et al. | |
| 2020/0285726 A1 | 9/2020 | Kalous | |
| 2021/0158067 A1* | 5/2021 | Hsu | G06F 21/35 |
| 2021/0192529 A1 | 6/2021 | Souchon et al. | |
| 2021/0256101 A1 | 8/2021 | Liu | |
| 2021/0279983 A1 | 9/2021 | Imanuel et al. | |

OTHER PUBLICATIONS

Uyeda, "Sealing of an Electronic Lock," U.S. Appl. No. 17/100,083, filed Nov. 20, 2020 (51 pgs).

Chinese Office Action issued in related Application No. 202080090273.3 dated Dec. 6, 2023.

\* cited by examiner

SYSTEM AND METHOD OF ENROLLING USERS OF A WIRELESS BIOMETRIC LOCKSET

CROSS-REFERENCE TO RELATED APPLICATION

This application is a continuation of U.S. patent application Ser. No. 17/104,300, now U.S. Pat. No. 11,501,579, filed Nov. 25, 2020; which claims the benefit of U.S. Provisional Application Ser. No. 62/940,569, filed Nov. 26, 2019; the disclosures of which are hereby incorporated by reference in their entireties.

TECHNICAL FIELD

This invention relates to the field of biometric locksets. More particularly, it relates to user enrollment and management of users of an electronic biometric lockset.

BACKGROUND

Wireless biometric locksets for residential premises, e.g., at residential exterior doors, are becoming increasingly popular for user convenience. For example, certain types of wireless biometric locksets may await a signal from a mobile device of a user to actuate an unlocking operation at a door. Other types of devices may allow actuation (e.g., unlocking) of the lockset if an authorized mobile device is within proximity of the lockset.

Electronic deadbolts are well known. Many electronic deadbolts include a keypad that allows users to enter a passcode to unlock the lock. In some cases, the keypads have physical buttons that the users press to enter passcodes while others include touch buttons or touch screens that operate on capacitive touch. With a touch screen lock controller, the keypad is able to sense touches of the user's finger on the keypad surface without the mechanical parts of a physical button. The user may engage the deadbolt and disengage the deadbolt through tactile input into the lock controller via the touch screen. In some instances, each user may be associated with a unique passcode that would separately identify each user when entered by that user. Additionally, in some instances, electronic deadbolts may include alternative user validation mechanisms, such as one or more biometric sensors. In such instances, a biometric sensor may be used to identify a particular user and selectively engage or disengage the deadbolt accordingly. However, when biometric sensors are used, it can be difficult for an administrative user (e.g., a user having rights to add or edit other user records for users who may be authorized to actuate the lock) to easily track and manage status of various users.

Electronic deadbolts are controlled by an administrative user. The administrative user has the ability to determine and control authorized and unauthorized users, and therefore determine who is able to unlock the deadbolt.

SUMMARY

The present disclosure relates generally to biometric locksets for doors. In one configuration, and by non-limiting example, a biometric lockset with a touch sensor and a method of enrolling users is described.

In a first aspect, a method of enrolling a user at a biometric lockset is described. The method includes the following steps. A user access information is received from a mobile device of an administrative user of the biometric lockset. The user access information indicates to the biometric lockset to enter an enrollment mode in which a user identity is associated with fingerprint data in a user entry within a memory of the biometric lockset. A first light code is displayed, which indicates an initial state of fingerprint data capture. A first fingerprint touch is received. The first message is transmitted by a wireless communication protocol to the mobile device, the message corresponding to the first light code. After receiving the first fingerprint touch, a second light code is displayed. The second light code is different than the first light code and is indicative of an intermediate state of fingerprint data capture, which is different from the first state. A second message is transmitted via the wireless communication interface to the mobile device, the message corresponding to the second light code. Then, at least a second fingerprint touch is received. A third light code is displayed, which is different than the first light code and the second light code. The third light code is indicative of a completed fingerprint data capture for the particular fingerprint of the user. A third message is transmitted via the wireless communication interface to the mobile device. The message corresponds to the third light code. The completed fingerprint data is stored in association with the user identity of the user in the user entry.

In another aspect, a biometric lockset is described. The lockset includes a processor, a battery, a memory communicatively connected to the processor, a light communication unit, a wireless communication interface, a locking bolt movable between locked and unlocked positions, a motor, and a fingerprint sensor. The motor is actuatable by the processing unit to move the locking bolt between the locked and unlocked positions. The fingerprint sensor is communicatively connected to the processing unit and is configured to receive fingerprint data. The processor is configured to execute instructions stored in the memory, the instructions cause the processor to perform the following steps. An enrollment mode is entered. A first light code is displayed, the first light code indicative of an initial state of fingerprint data capture. The first fingerprint touch is received. A second light code is displayed, which is different from the first light code. The second light code is indicative of an intermediate state of fingerprint data capture, which is different from the initial state. Then an enrollment status message is transmitted by a wireless communication protocol to the mobile device. The enrollment status message corresponds to the second light code. Upon completion of capturing the fingerprint data, a fingerprint representation is stored based on the fingerprint data with the user identity in the user entry.

In another aspect, a system including an application and a biometric lockset is described. The application is installed on a mobile device having a wireless communication interface and a display. The biometric lockset includes a processor, a battery, a memory communicatively connected to the processor, a light communication unit, a wireless communication interface, a locking bolt movable between locked and unlocked positions, a motor, and a fingerprint sensor. The motor is actuatable by the processing unit to move the locking bolt between the locked and unlocked positions. The fingerprint sensor is communicatively connected to the processing unit and is configured to receive fingerprint data. The processor is configured to execute instructions stored in the memory and cause the processor to perform the following steps. An indication is received from the mobile device and causes the lockset to enter into an enrollment mode. A first light code is displayed on the light communication unit and a first message is transmitted to the application. The first message corresponds to the first light code. A second light code is displayed on the light communication unit and a second message is transmitted to the application. The second message corresponds to the second light code. The second light code is different from the first light code. A fingerprint representation is stored in the memory based on the fingerprint data and is stored in association with the user identity in the user entry.

In yet another aspect, a method of enrolling a user at a biometric lockset is described. A notification is sent from an application to a lockset to enter an enrollment mode. The application is associated with an administrative user and is executable on a mobile device wirelessly connected to the lockset. A notification is received from the biometric lockset that a first fingerprint touch is received. A first message is displayed on a display of the mobile device, the first message corresponding to receiving the first fingerprint touch. A notification is received from the biometric lockset that a second fingerprint touch is received. A second message is displayed on the display of the mobile device, the second message corresponding to receiving the second fingerprint touch. The second message is different from the first message. A user identity and an indication that a completed fingerprint data is received is stored at a server accessible by the application.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
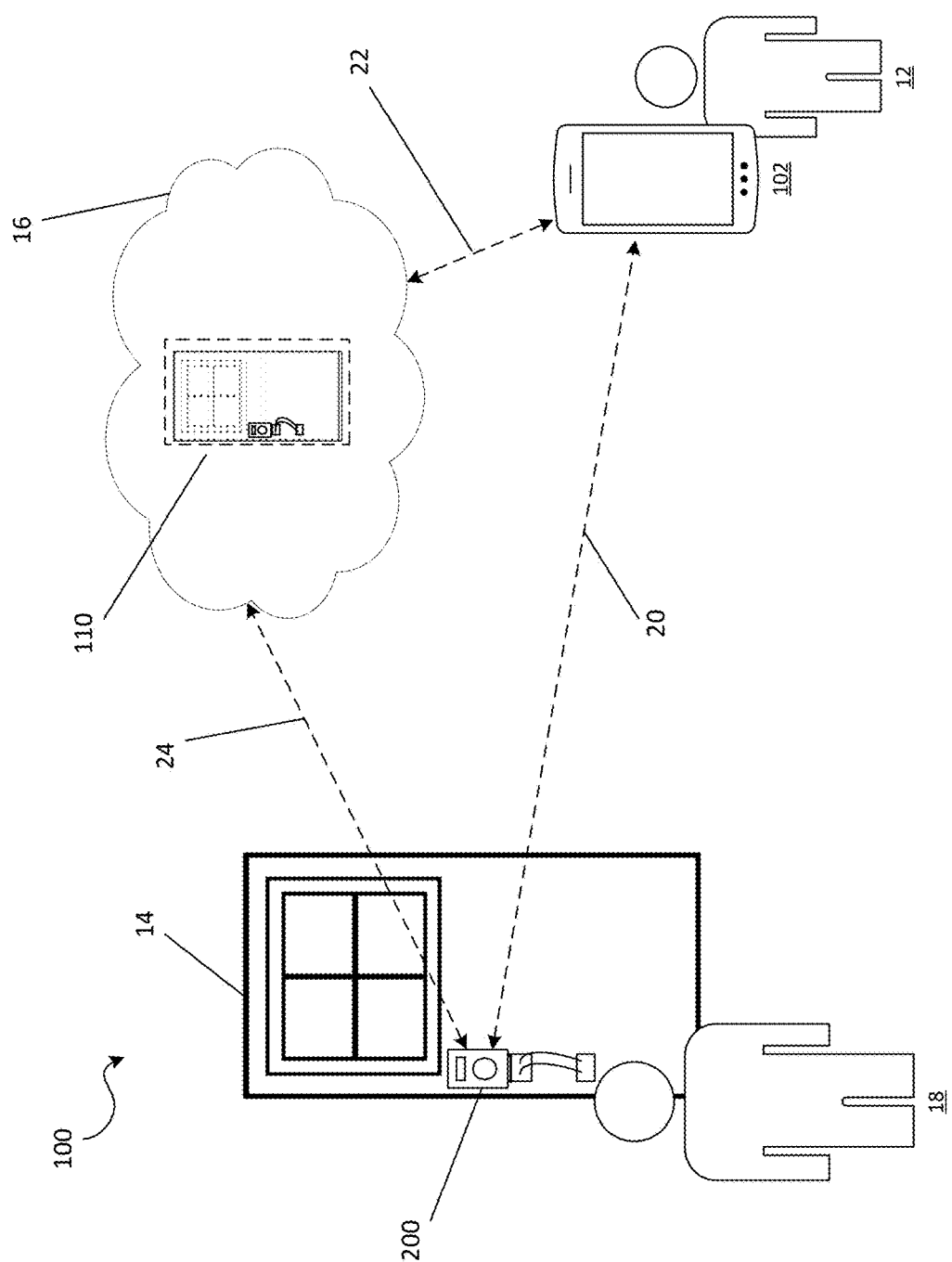
FIG. 1 illustrates an environment in which aspects of the present disclosure may be implemented.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In accordance with aspects of the present disclosure, methods and systems for user management and biometric data used to access or actuate an electronic lock are described. In particular, disclosed are methods of enrolling and managing users, while notifying an administrative user of status of such enrollment. The methods described herein may be performed on a biometric wireless electronic lock set, optionally in combination with a mobile device that is communicatively connected thereto.

FIG. 1 illustrates an environment 100 in which aspects of the present disclosure may be implemented. An administrative user 12 has a phone or other mobile device 102 with wireless communication capabilities. A user 18 is a user who is enrolling fingerprint data to become an authorized user to lock or unlock a lockset 200. The administrative user 12 and the user 18 may be the same user, or may be different users. A door 14 includes a biometric lockset 200 (also referred as a wireless biometric lockset). The mobile device 102 is capable of communicating 22 with a server 110 and communicating 20 with the biometric lockset 200.

The server 110 can be, for example, a physical server or a virtual server hosted in a cloud storage environment 16. In some embodiments, the biometric lockset 200 is also capable of communicating 24 with the server 110. Such communication can optionally occur via one or more wireless communication protocols, e.g., Wi-Fi (IEEE 802.11), short-range wireless communication to a Wi-Fi bridge, or other connection mechanism. The server 110 generally authenticates the biometric lockset 200 before establishing a secure connection. Alternatively, the biometric lockset 200 can authenticate the server 110 to establish a secure connection. In some instances, the server 110 and the lockset 200 operate to mutually authenticate each other in order to provide a higher level of security when establishing a connection.

Figure 2:
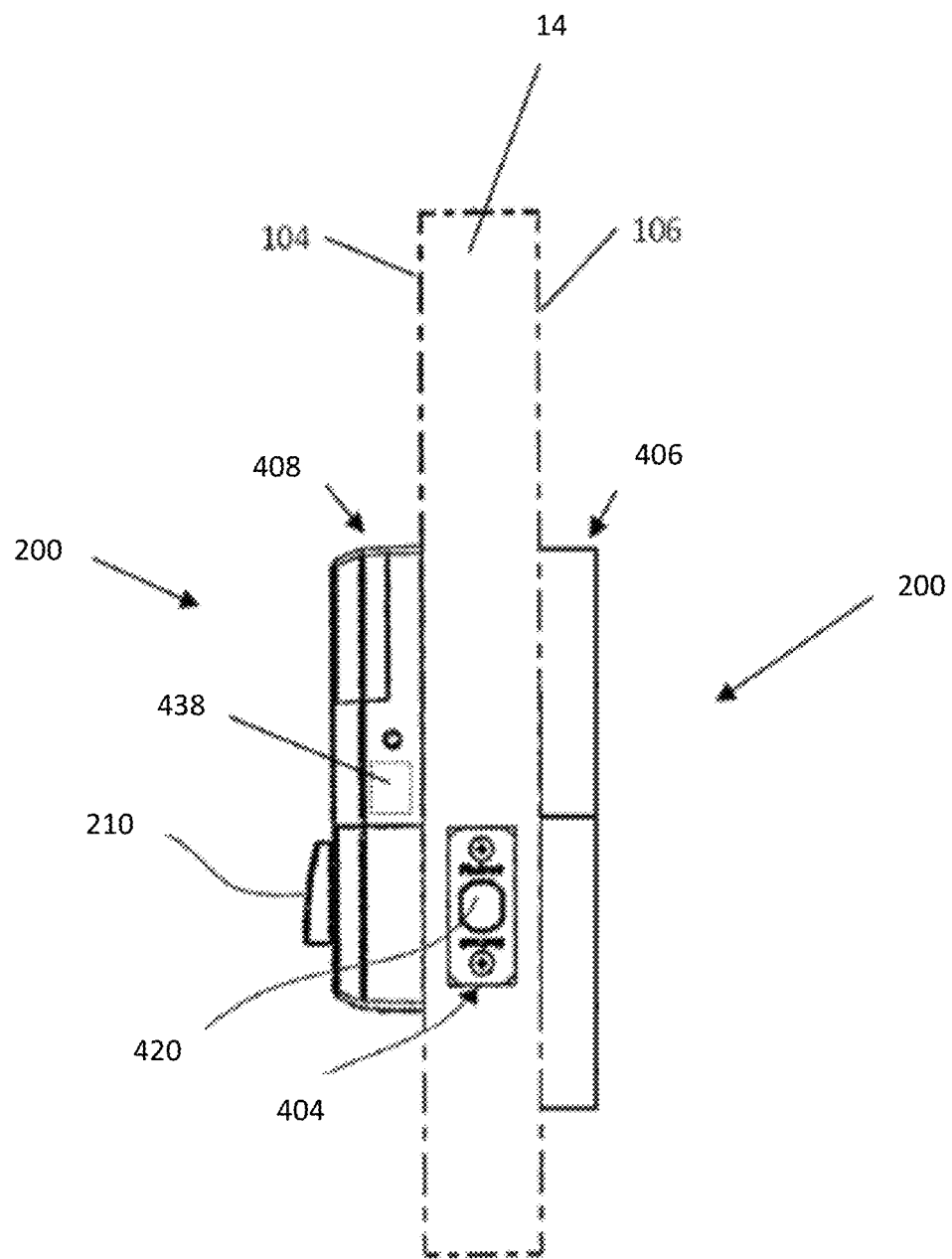
FIG. 2 illustrates a perspective view of a portion of a biometric lockset.
Figure 3:
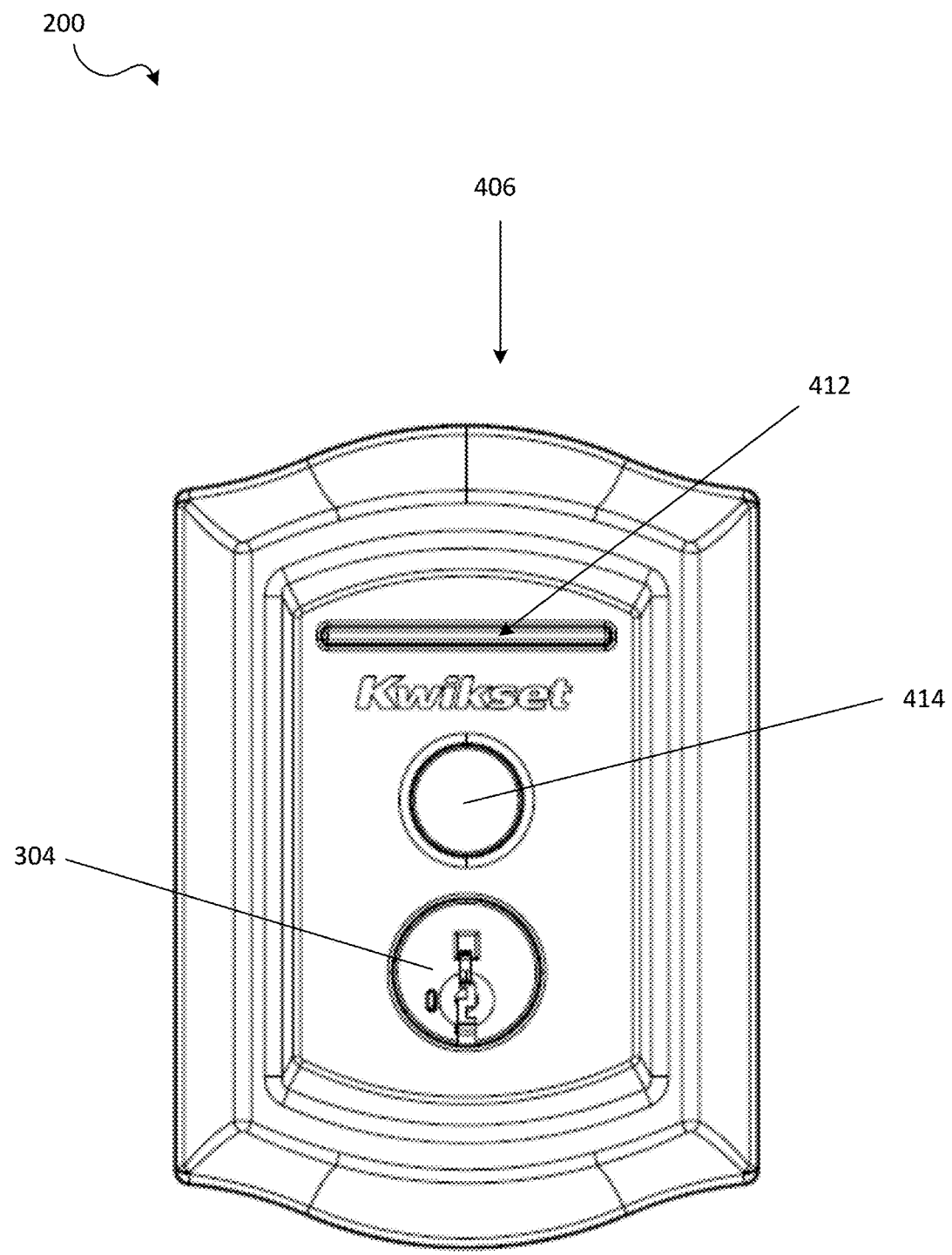
FIG. 3 illustrates a front perspective view of a portion of the biometric lockset of FIG. 2.

FIGS. 2-3 illustrate a biometric lockset 200 as installed at a door 14, according to one example of the present disclosure. The door 14 has an interior side 104 and an exterior side 106. The biometric lockset 200 includes an interior assembly 408, an exterior assembly 406, and a latch assembly 404. The latch assembly 404 is shown to include a bolt 420 that is movable between an extended position (locked) and a retracted position (unlocked, shown in FIGS. 2-3). Specifically, the bolt 420 is configured to slide longitudinally and, when the bolt 420 is retracted, the door 14 is in an unlocked state. When the bolt 420 is extended, the bolt 420 protrudes from the door 14 into a door jamb (not shown) to place the door 14 in a locked state.

In some examples, the interior assembly 408 is mounted to the interior side 104 of the door 14, and the exterior assembly 406 is mounted to the exterior side 106 of the door 14. The latch assembly 404 is typically at least partially mounted in a bore formed in the door 14. The term "outside" is broadly used to mean an area outside the door 14 and "inside" is broadly used to denote an area inside the door 14. With an exterior entry door 14, for example, the exterior assembly 406 may be mounted outside a building, while the interior assembly 408 may be mounted inside a building. With an interior door 14, the exterior assembly 406 may be mounted inside a building, but outside a room secured by the biometric lockset 200, and the interior assembly 408 may be mounted inside the secured room. The biometric lockset 200 is applicable to both interior and exterior doors.

The interior assembly 408 can include a processing unit 438 (shown schematically at FIG. 4 and described in detail below) containing electronic circuitry for the biometric lockset 200. In some examples, the interior assembly 408 includes a manual turn piece 210 that can be used on the interior side 104 of door 14 to move the bolt 420 between the extended and retracted positions.

The processing unit 438 is operable to execute a plurality of software instructions (i.e., firmware) that, when executed by the processing unit 438, cause the biometric lockset 200 to implement the methods and otherwise operate and have functionality as described herein. The processing unit 438 may comprise a device commonly referred to as a processor, e.g., a central processing unit (CPU), digital signal processor (DSP), or other similar device, and may be embodied as a standalone unit or as a device shared with components of the biometric lockset 200. The processing unit 438 may include memory communicatively interfaced to the processor for storing the software instructions. Alternatively, the biometric lockset 200 may further comprise a separate memory device for storing the software instructions that is electrically connected to the processing unit 438 for the bi-directional communication of the instructions, data, and signals therebetween.

FIG. 3 illustrates an example exterior assembly 406 of the biometric lockset 200. The exterior assembly 406 includes a light source 412, a biometric sensor 414, and an optional keyway 304.

The biometric sensor 414 is configured to receive a biometric input from a user, such as a fingerprint. The biometric sensor 414 receives the fingerprint from the user and transmits the biometric data to the processing unit 438 for further processing.

The light source 412 may illuminate to display a plurality of responses or signals to the user 18. For example, the light source 412 includes a plurality of LEDs, such that different light patterns can be displayed. For example, the light source 412 may illuminate different numbers of lights to indicate an enrollment status. The light source 412 may also be a battery low signal or an error signal. Any other symbols may be used as well to convey messages to the user, indicate battery levels, indicate malfunctions, and indicate operational status.

Additional details regarding example construction of an exterior assembly of a biometric lockset, such as biometric lockset 200, are provided in U.S. patent application Ser. No. 17/100,083, entitled "Sealing of an Electronic Lock," the disclosure of which is hereby incorporated by reference in its entirety.

Figure 4:
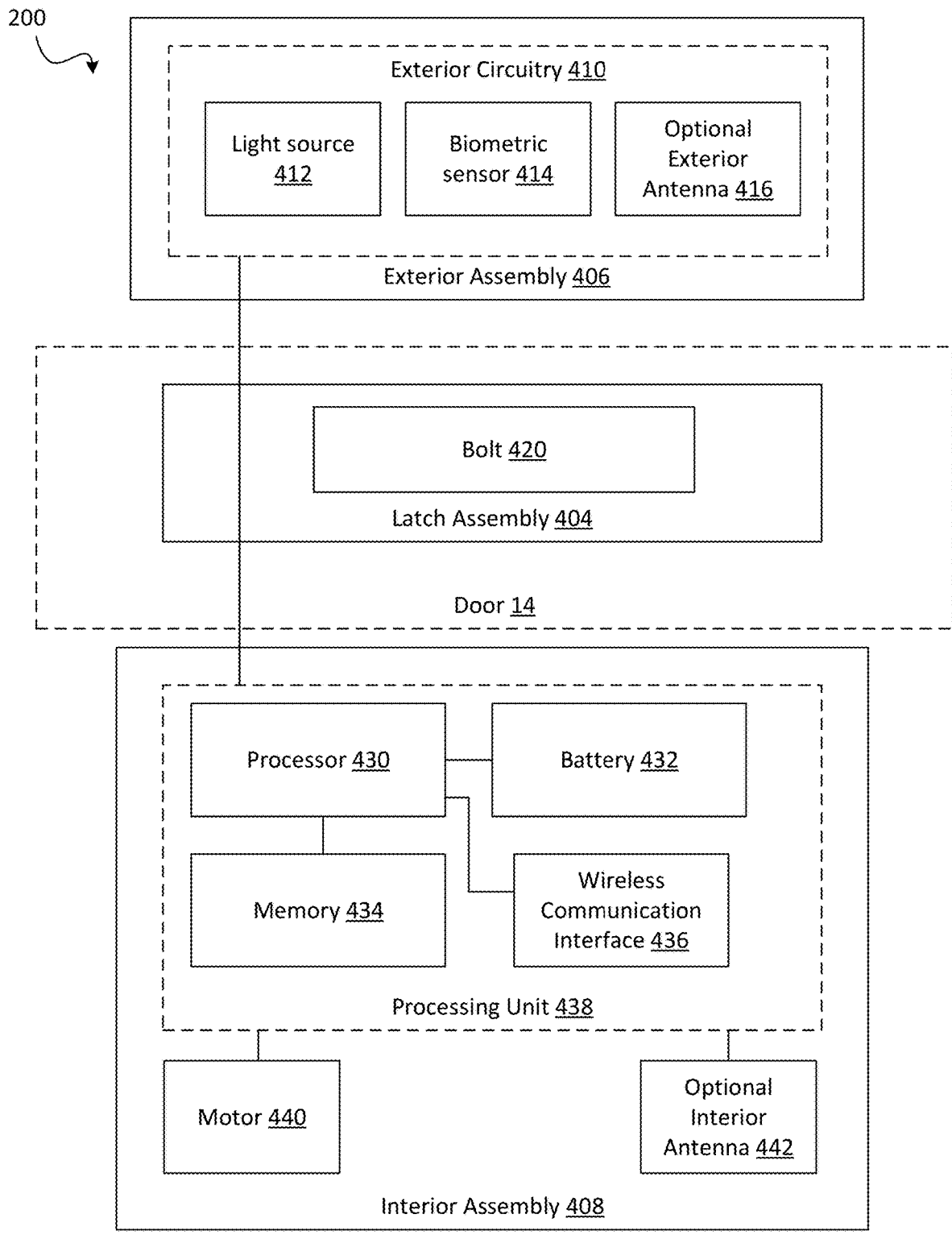
FIG. 4 is a schematic representation of the biometric lockset.

FIG. 4 is a schematic representation of the biometric lockset 200 mounted to the door 14. The interior assembly 408, the exterior assembly 406, and the latch assembly 404 are shown.

The exterior assembly 406 as shown, includes an exterior circuitry 410, which includes a light source 412, a biometric sensor 414, and an optional exterior antenna 416 usable for communication with a remote device, such as mobile device 102. In some examples, the exterior circuitry 410 is electrically connected to the processing unit 438. Specifically, the biometric sensor 414 is electrically connected to the interior assembly 408, specifically to the processing unit 438, by, for example, an electrical cable (not shown) that passes through the door 14. When the user 18 inputs a valid code via biometric sensor 414 that is recognized by the processing unit 438, an electrical motor is energized to retract the bolt 420 of the latch assembly 404, thus permitting the door 14 to be opened from a closed position. Still further, an electrical connection between the exterior assembly 406 and the interior assembly 408 allows the processing unit 438 to communicate with other features included in the exterior assembly 406, as noted below.

The optional exterior antenna 416 is capable of being used in conjunction with an optional interior antenna 442, such that the processing unit 438 can determine where a mobile device 102 is located. Only a mobile device 102 determined to be located on the exterior of the door 14 is able to enroll and/or edit user entries.

The biometric sensor 414 may be configured to receive biometric data, such as fingerprint data. In use, the biometric sensor 414 receives biometric data from a user 18, and transmits the biometric data to the processing unit 438 for further processing.

The light source 412 is capable of displaying a plurality of messages to a user 18. In a first embodiment, the light source 412 includes multiple individual lights, each of which are capable of lighting individually to display different messages to the user 18. In a further embodiment, the light source 412 may display other messages to the user 18, such as operational status, malfunction indications, battery levels, or other error signals. The light source 412 is in communication with the processing unit 438.

In the various examples of operation described below, the light source 412 is usable to communicate status messages to a user that is viewing the exterior assembly 406 via light flashing patterns and/or colors. Although the examples below relate primarily to a sequence of messages used for enrolling a new user or entering new biometric data for a known user, other light flashing or display sequences may be used as well. Example operation of a similar light source is described in further detail in U.S. Pat. No. 9,024,759, entitled "Biometric Lockset With Integrated Antenna, Touch Activation, and Light Communication Method," the disclosure of which is hereby incorporated by reference in its entirety.

As described above, the interior assembly 408 includes the processing unit 438. The interior assembly 408 can also include a motor 440 and an optional interior antenna 442.

As shown, the processing unit 438 includes at least one processor 430 communicatively connected to a memory 434, a wireless communication interface 436 (e.g., a Wi-Fi interface and/or Bluetooth interface), and a battery 432. The processing unit 438 is located within the interior assembly 408 and is capable of operating the biometric lockset 200, e.g., by actuating the motor 440 to actuate the bolt 420.

In a first embodiment, the processor 430 can process fingerprint data received at the biometric sensor 414 to enroll a user 18. In other examples, the processor 430 can process signals received from the biometric sensor 414 to determine whether the bolt 420 should be actuated and/or the light source 412 should display a message. Such processing can be based on a set of preprogrammed instructions (i.e., firmware) stored in the memory 434. In an example embodiment, the processing unit 438 is configured to capture fingerprint data received at the biometric sensor 414 from a user 18 and store the fingerprint data in the memory 434.

Preprogrammed instructions are directed towards a process for enrolling authorized users 18. The process includes first entering an enrollment mode, where completed fingerprint data can be stored in association with a user identity in a user entry. Before any fingerprint touches are received, a first light code is displayed on the lockset, which is indicative of an initial state of fingerprint data capture. A first fingerprint touch is received, and a second light code is displayed on the lockset. The second light code is different than the first light code and is indicative of an intermediate state of fingerprint data capture. Then, at least a second fingerprint touch is received. A third light code is displayed, which is indicative of a completed fingerprint data capture. At the same time, messages are transmitted by a wireless communication interface to a mobile device 102, so the mobile device 102 can display messages corresponding to the light codes displayed on the lockset 200. This is explained in further detail below.

Preprogrammed instructions can also include processes for managing a list of authorized users. In addition to the list of authorized users, the preprogrammed instructions may include information associated with each user 18, such as a specific date, a specific day of the week, or an hourly time limit that the user 18 is able to actuate the lockset 200. For example, after an enrollment mode is completed and the lockset 200 is in an operative mode, fingerprint data corresponding to an authorized user 18 causes the motor 440 to actuate the bolt 420. Conversely, fingerprint data corresponding to an unknown user causes the light source 412 to display an error message and not actuate the bolt 420.

In some examples, the processor 430 can process signals received from a variety of devices to determine whether the biometric lockset 200 should be actuated. Such processing can be based on a set of preprogrammed instructions (i.e., firmware) stored in the memory 434 as described above. In certain embodiments, the processing unit 438 can include a plurality of processors 430, including one or more general purpose or specific purpose instruction processors. In some examples, the processing unit 438 is configured to capture a biometric input event from a user 18 and store the biometric input event in the memory 434.

The memory 434 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

As noted above, the processing unit 438 can include at least one wireless communication interface 436, such as a Wi-Fi interface and/or a Bluetooth interface. Interfaces for other types of wireless communication can be used in addition to or instead of Wi-Fi and Bluetooth. For example, a wireless communication interface could be included with the processing unit 438. Other RF circuits can be included as well. In the example shown, the wireless communication interface 436 is capable of communication using at least one wireless communication protocol. In some examples, the processing unit 438 can communicate with a remote device via the wireless communication interface 436. In some examples, the processing unit 438 can communicate with one or both of the mobile device 102 and server 110 via the Wi-Fi interface, and can communicate with the mobile device 102 when the mobile device 102 is in proximity to the biometric lockset 200 via the Bluetooth interface. In some embodiments, the processing unit 438 is configured to communicate with the mobile device 102 via the Bluetooth interface, and communications between the mobile device 102 and biometric lockset 200 when the mobile device 102 is out of range of Bluetooth wireless signals can be relayed via the server 110, e.g., via the Wi-Fi interface.

Of course, in alternative embodiments, other wireless protocols could be implemented as well, via one or more additional wireless interfaces. In some examples, the biometric lockset 200 can wirelessly communicate with external devices through a desired wireless communications protocol. In some examples, an external device can wirelessly control the operation of the biometric lockset 200, such as operation of the bolt 420. The biometric lockset 200 can utilize wireless protocols including, but not limited to, the IEEE 802.11 standard (Wi-Fi), the IEEE 802.15.4 standard (Zigbee and Z-wave), the IEEE 802.15.1 standard (Bluetooth®), a cellular network, a wireless local area network, near-field communication protocol, and/or other network protocols. In some examples, the biometric lockset 200 can wirelessly communicate with networked and/or distributed computing systems, such as may be present in a cloud-computing environment.

Additionally, various other settings can be viewed and/or modified via wireless communication interface 436 from the server 110; as such, a user 18 of a mobile device 102 may access an account associated with the biometric lockset 200 to view and modify settings of that lock, which are then propagated from the server 110 to the biometric lockset 200. In alternative embodiments, other types of wireless interfaces can be used; generally, the wireless interface used for communication with a mobile device 102 can operate using a different wireless protocol than a wireless interface used for communication with the server 110.

The interior assembly 408 also includes the battery 432 to power the biometric lockset 200. In one example, the battery 432 may be a standard single-use (disposable) battery. Alternatively, the battery 432 may be rechargeable. In still further embodiments, the battery 432 is optional altogether, replaced by an alternative power source (e.g., an AC power connection).

The interior assembly 408 also includes the motor 440 that is capable of actuating the bolt 420. In use, the motor 440 receives an actuation command from the processing unit 438, which causes the motor 440 to actuate the bolt 420 from the locked position to the unlocked position or from the unlocked position to the locked position. In some examples, the motor 440 actuates the bolt 420 to an opposing state. In some examples, the motor 440 receives a specified lock or unlock command, where the motor 440 only actuates the bolt 420 if the bolt 420 is in the correct position. For example, if the door 14 is locked and the motor 440 receives a lock command, then no action is taken. If the door 14 is locked and the motor 440 receives an unlock command, then the motor 440 actuates the bolt 420 to unlock the door 14.

As noted above, an optional interior antenna 442 may also be located in the interior assembly 408. In some examples, the optional interior antenna 442 is capable of operating together with an optional exterior antenna 416 to determine the location of the mobile device 102. Only a mobile device 102 determined to be located on the exterior side 106 of the door 14 is able to communicate with the lockset 200 to enroll a user 18. This prevents unauthorized users from being located near the biometric lockset 200 and taking advantage of an authorized mobile device 102 that may be located on the interior side 104 of the door 14, even though the authorized mobile device 102 is not being used to enroll a user 18.

Referring to FIGS. 2-4 generally, in example embodiments, the biometric lockset 200 may be used on both interior and exterior doors. Described below are non-limiting examples of a wireless biometric lockset 200. It should be noted that the biometric lockset 200 may be used on other types of doors, such as a garage door or a doggie door, or other types of doors that require an authentication process to unlock (or lock) the door.

Figure 5:
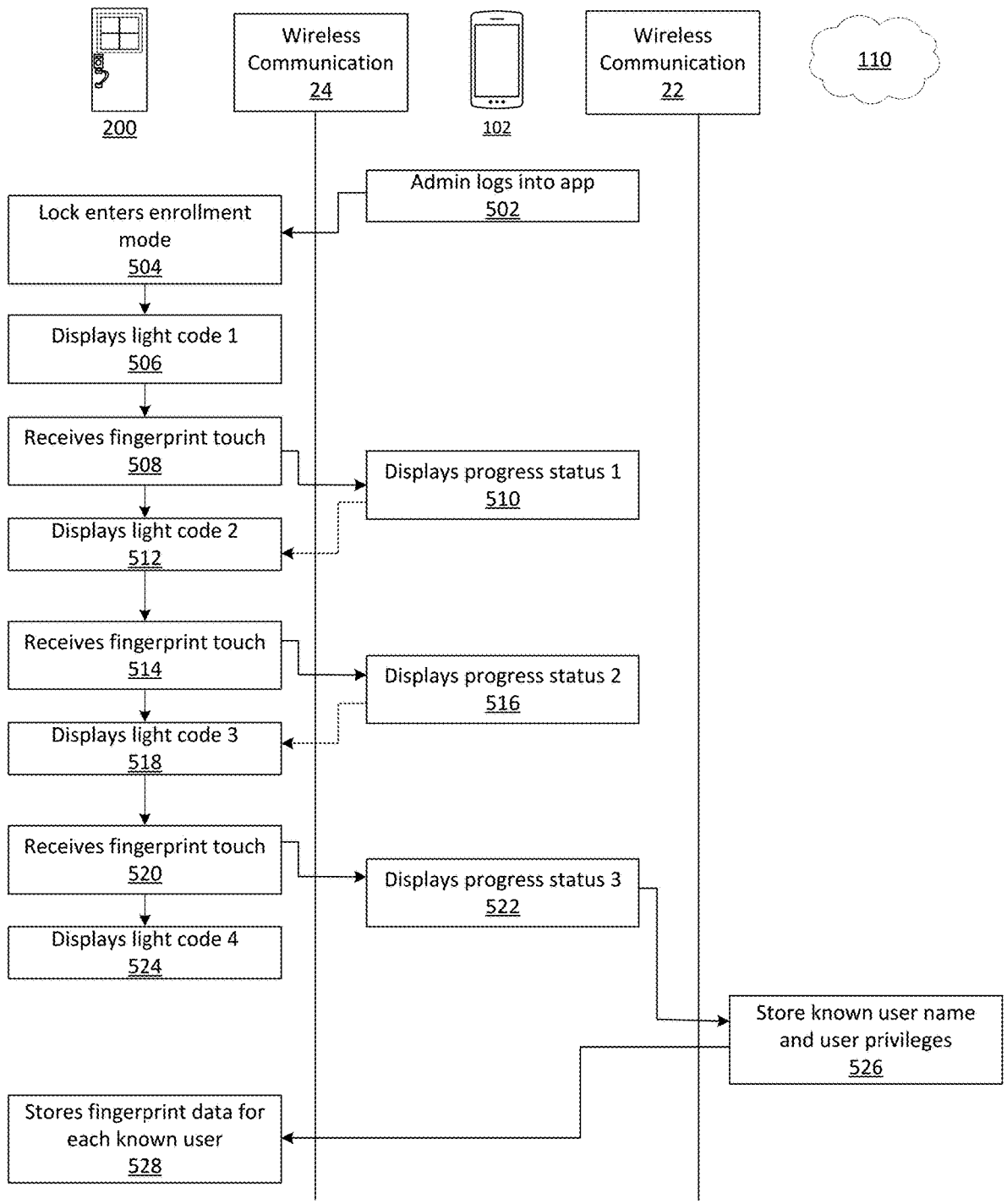
FIG. 5 is a flowchart of an example method of authenticating a biometric lockset, in accordance with example aspects of the present disclosure.

FIG. 5 illustrates an example method of communication between the server 110, a mobile device 102, and the lockset 200. The server 110 communicates via wireless communication 22 with the mobile device 102, and the mobile device 102 communicates via wireless communication 24 with the biometric lockset 200. FIG. 5 also illustrates an example method of enrolling a user's fingerprint data at the lockset 200. The user 18 may be the administrative user 12, where the administrative user 12 is able to see both the lockset 200 light codes and the progress status displayed on the mobile device 102. In another embodiment, the enrolling user 18 is not the administrative user 12. The enrolling user 18 sees the lockset 200 light codes, while the administrative user 12 sees the progress status displayed on the mobile device 102. The administrative user 12 may or may not be in the same location together. For example, the enrolling user 18 may be outside the door 14 at the lockset 200, while the administrative user 12 may be located either at the same location as the enrolling user 18, or in another location.

At step 502, an administrative user 12 logs into an application installed on a mobile device 102 having a wireless communication interface and a display. As described above, the administrative user 12 is able to enroll and edit other users' capability of actuating the lockset 200. In example embodiments, the lockset 200 only enters the enrollment mode when an administrative user 12 has selected this option on the application executing on the mobile device. In alternative embodiments, the lockset 200 may enter the enrollment mode based on selection of that mode on the biometric lockset itself, for example by pressing a button on a surface that is only accessible by trusted users 18 (e.g., on an interior portion of the lock, or behind a faceplate of a lock).

At step 504, the lockset 200 enters an enrollment mode. An enrollment mode enables a new user 18 to enter their fingerprint data at the lockset 200, but does not allow a user 18 to actuate the lockset 200. The enrollment mode may be confirmed on a mobile device 102 of the administrative user 12, e.g., by displaying a user interface confirming the enrollment mode status of the lockset 200.

At step 506, a first light code is displayed on the lockset 200. The first light code is indicative of an initial state of fingerprint data capture. For example, the first light code can indicate to a user 18 that the lockset 200 is in an enrollment mode, but has not received a fingerprint touch yet, and is ready to receive a first fingerprint touch.

At step 508, the lockset 200 receives a first fingerprint touch from a user 18. After receiving the first fingerprint touch, in some embodiments the lockset 200 sends a notification to the application on a mobile device 102. At step 510, the mobile device 102 displays a first status message in response to receipt of the notification. Additionally, at step 512, the lockset 200 displays a second light code. The second light code is different than the first light code. The first status message and the second light code are, in some embodiments, displayed concurrently at their respective devices, and are indicative of an intermediate state of fingerprint data capture. For example, the second light code displayed on the lockset 200 may be a display of two lights, and the first message on the application may be a display of a percentage of the fingerprint data captured. In this way, the administrative user 12 may be able to follow, via a user interface of a mobile device 102, the current (partial) enrollment status of an enrolling user 18, without having to also view the second light code.

In an embodiment, the process occurring at steps 508, 510, and 512 may be repeated one or more times to fully capture fingerprint data. For example, the process may be repeated as shown at steps 514, 516, and 518, respectively, as described below. However, when the lockset 200 has received sufficient fingerprint touch data, the enrollment process is completed.

At step 514, the lockset 200 receives a second fingerprint touch from a user 18. After receiving the second fingerprint touch, in some embodiments the lockset 200 sends a notification to the application on a mobile device 102. After receiving the notification, at step 516, the mobile device 102 displays a second status message. Additionally, at step 518, following receipt of the second fingerprint touch, the lockset 200 displays a third light code. In example implementations, the third light code is different than the second light code and the first light code. The second status message is different than the first status message. In example implementations in which the lockset 200 sends a notification to the mobile device 102 regarding the second fingerprint touch, the second status message and the third light code can be displayed concurrently at their respective devices, and are indicative of an intermediate state of fingerprint data capture. For example, the third light code displayed on the lockset 200 may be a display of three lights, and the second message on the application may be a display of a percentage of the fingerprint data captured (or percentage completion of an overall enrollment process generally).

At step 520, the lockset 200 receives a third fingerprint touch from a user 18. After receiving the third fingerprint touch, the lockset 200 sends a notification to the application on a mobile device 102. After receiving the notification, at step 522, the mobile device 102 displays a third status message. At the same time, at step 524, the lockset 200 displays a fourth light code. The fourth light code is different than the first light code, the second light code, and the third light code. The third status message is different than the second status message and the first status message. The third status message and the fourth light code are displayed concurrently at their respective devices, and are indicative of a completed state of fingerprint data capture. For example, the fourth light code displayed on the lockset 200 may be a display of four lights, and the third message on the application may be a display of a completed percentage of the fingerprint data captured.

At step 526, the username and user privileges are stored at the server 110. The user name and known privileges are sent to the lockset 200. At 528, the lockset 200 stores the fingerprint data for each known user 18 and their corresponding user privileges. The fingerprint data is only stored at the lockset 200 and not the server 110.

Although discussed in the context of three fingerprint touches, it is noted that more or fewer fingerprint touches may be used by the lockset 200 to accomplish user enrollment. In some embodiments, as few as a single fingerprint touch may be used. In other embodiments, two or more fingerprint touches may be used. The number of fingerprint touches used may be dependent upon the specific biometric sensor used in the lockset 200, the degree of accuracy required by the biometric sensor, and the level of security required by the lockset 200. In some examples, the number of fingerprint touches may be defined by an administrative user 12 within an application on a mobile device 102.

Referring now to FIGS. 6a-6b, 7a-7b, 8a-8b, and 9a-9b, in some examples, the displays may be presented concurrently on the lockset 200 and mobile device 102, respectively, such that feedback is provided to the enrolling user 18 and the administrative user 12 at the same time, which provides validation of the current state of the lockset 200 by allowing the administrative user 12 to view the user interface of the mobile device and the lockset display to ensure proper operation of the lockset 200 or learn next steps to be performed at the lockset 200 (in case the lockset display is insufficiently intuitive). Additionally, for cases in which the administrative user 12 and the enrolling user 18 are different users, the administrative user 12 may not need to be located at the lockset 200 or at least may not need to view the lockset 200 to be able to follow along with enrollment status of the enrolling user 18.

Figure 6B:
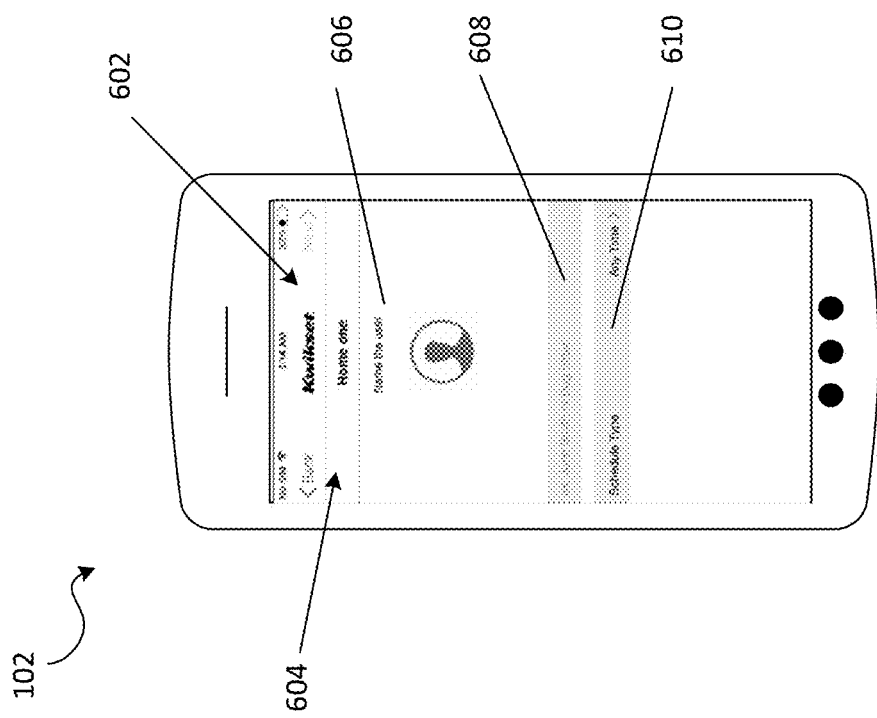
FIGS. 6a and 6b illustrate an example light pattern on the lockset and corresponding user interface on a mobile device.
Figure 6A:
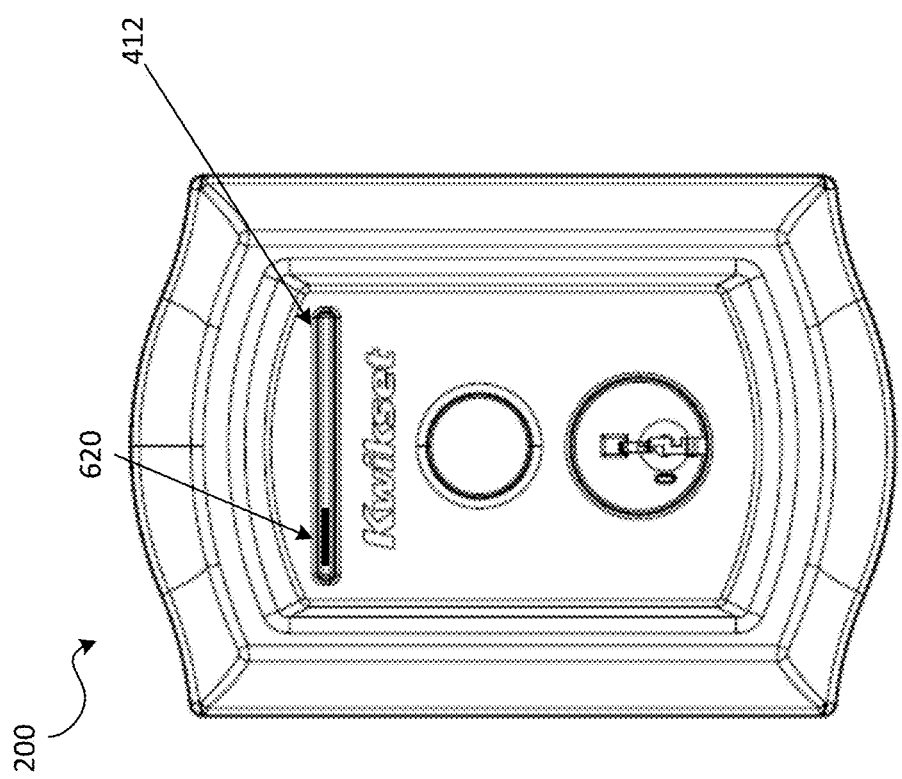

FIGS. 6a and 6b illustrate an example of coordinated displays on the lockset 200 and the mobile device 102. FIG. 6a shows a lockset 200 with a light source 412 displaying a first light code 620. FIG. 6b shows a mobile device 102 displaying a user interface 602. The user interface 602 includes an enrollment screen 604 having a user identity field 606, a user name field 608, and a schedule type field 610. The administrative user 12 is able to enter the respective information into the user identity field 606, the user name field 608, and the schedule type field 610.

In an example embodiment, the enrollment screen 604 corresponds to the first light code 620 on the lockset 200. For example, the first light code 620 displays one light, which indicates to a user 18 that the lockset 200 is in the enrollment mode and is ready to receive a first fingerprint touch.

Figure 7B:
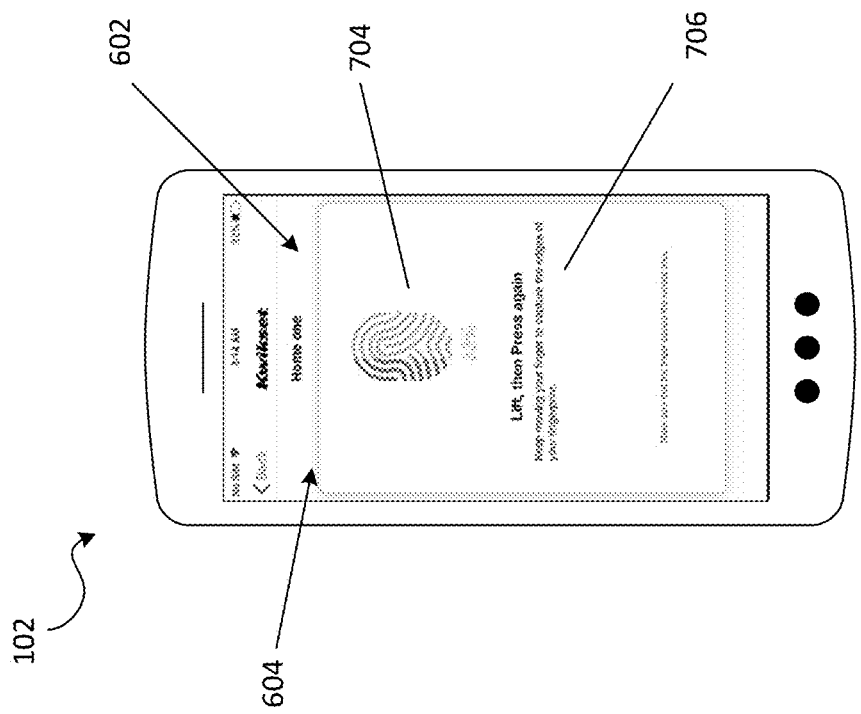
FIGS. 7a and 7b illustrate another example light pattern on the lockset and corresponding user interface on a mobile device.
Figure 7A:
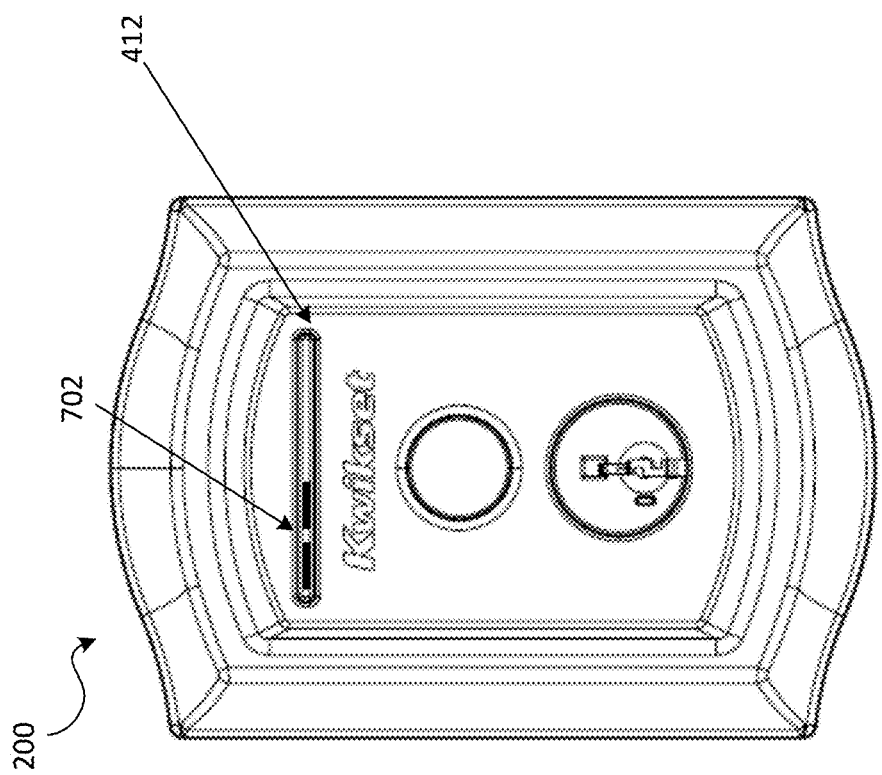

FIGS. 7a and 7b illustrate another example of coordinated displays on the lockset 200 and the mobile device 102 at a different stage of enrollment. FIG. 7a shows a lockset 200 with a light source 412 displaying a second light code 702. FIG. 7b shows a mobile device 102 displaying a user interface 602. The user interface 602 displays the enrollment screen 604 having a progress display 704 and an instruction display 706. In an example embodiment, the progress display 704 corresponds to the second light code 702 on the lockset 200. For example, the progress display 704 illustrates that the fingerprint enrollment is 33% complete, and the instruction display 706 states that the user 18 should "lift, then press again." At the same time, the second light code 702 displays two lights, which indicates to a user 18 that the lockset 200 is in the enrollment mode and has received a first fingerprint touch and is ready to receive a subsequent fingerprint touch.

Figure 8B:
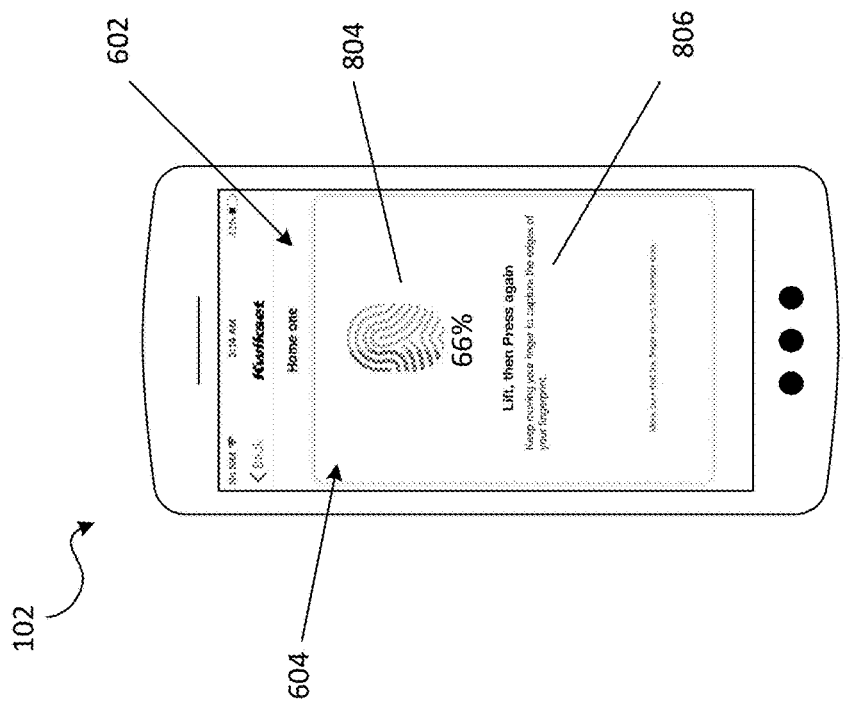
FIGS. 8a and 8b illustrate another example light pattern on the lockset and corresponding user interface on a mobile device.
Figure 8A:
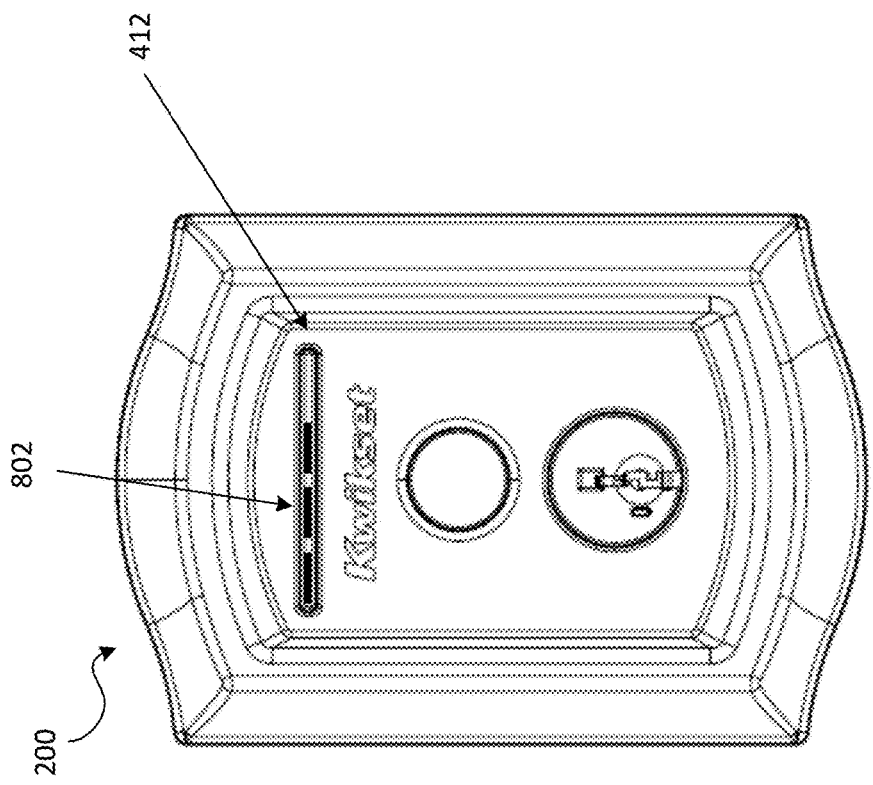

FIGS. 8a and 8b illustrate another example of coordinated displays on the lockset 200 and the mobile device 102 at yet another phase of an enrollment mode. FIG. 8a shows a lockset 200 with a light source 412 displaying a third light code 802. FIG. 8b shows a mobile device 102 displaying a user interface 602. The user interface 602 displays the enrollment screen 604 having a progress display 804 and an instruction display 806. In an example embodiment, the progress display 804 corresponds to the third light code 802 on the lockset 200. For example, the progress display 804 illustrates that the fingerprint enrollment is 66% complete, and the instruction display 806 states that the user 18 should "lift, then press again." At the same time, the third light code 802 displays three lights, which indicates to a user 18 that the lockset 200 is in the enrollment mode and has received a second fingerprint touch and is ready to receive another subsequent fingerprint touch. Alternatively, another subsequent fingerprint touch may not be needed, which is described below.

Figure 9B:
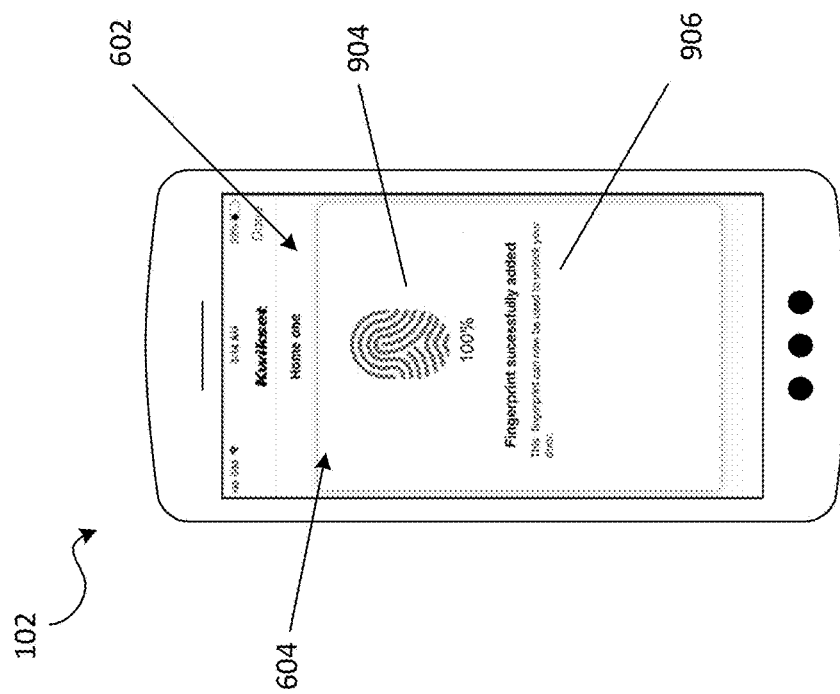
FIGS. 9a and 9b illustrate another example light pattern on the lockset and corresponding user interface on a mobile device.
Figure 9A:
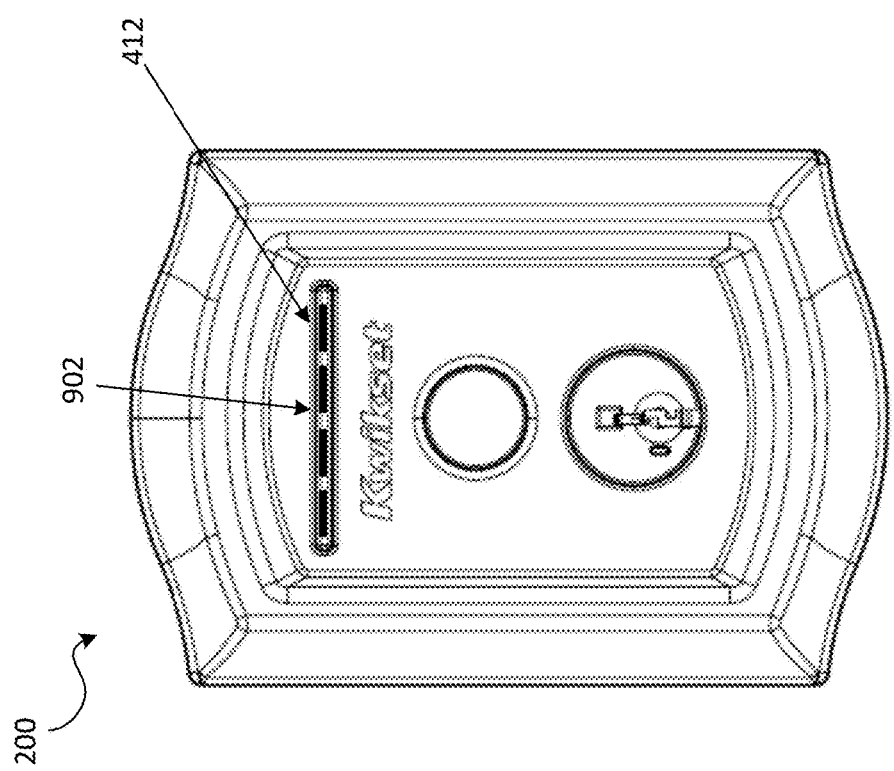

FIGS. 9a and 9b illustrate yet another example of coordinated displays on the lockset 200 and the mobile device 102 at a final enrollment mode. FIG. 9a shows a lockset 200 with a light source 412 displaying a fourth light code 902. FIG. 9b shows a mobile device 102 displaying a user interface 602. The user interface 602 displays the enrollment screen 604 having a progress display 904 and an instruction display 906. In an example embodiment, the progress display 904 corresponds to the fourth light code 902 on the lockset 200. For example, the progress display 904 illustrates that the fingerprint enrollment is 100% complete, and the instruction display 906 states that the "fingerprint successfully added." At the same time, the fourth light code 902 displays four lights, which indicates to a user 18 that the lockset 200 has completed the enrollment mode for the user 18.

In an alternative embodiment, the light codes 620, 702, 802, 902 may display different color lights that indicate to a user 18 the status of the fingerprint enrollment. For example, the light codes 620, 702, 802, 902 indicating to a user 18 that subsequent fingerprint touches are needed are yellow, and the light codes 620, 702, 802, 902 indicating that the enrollment mode is complete are green. Still further, the light codes 620, 702, 802, 902 may be blinking lights. Still further, the light source 412 may include icons or symbols.

Figure 10:
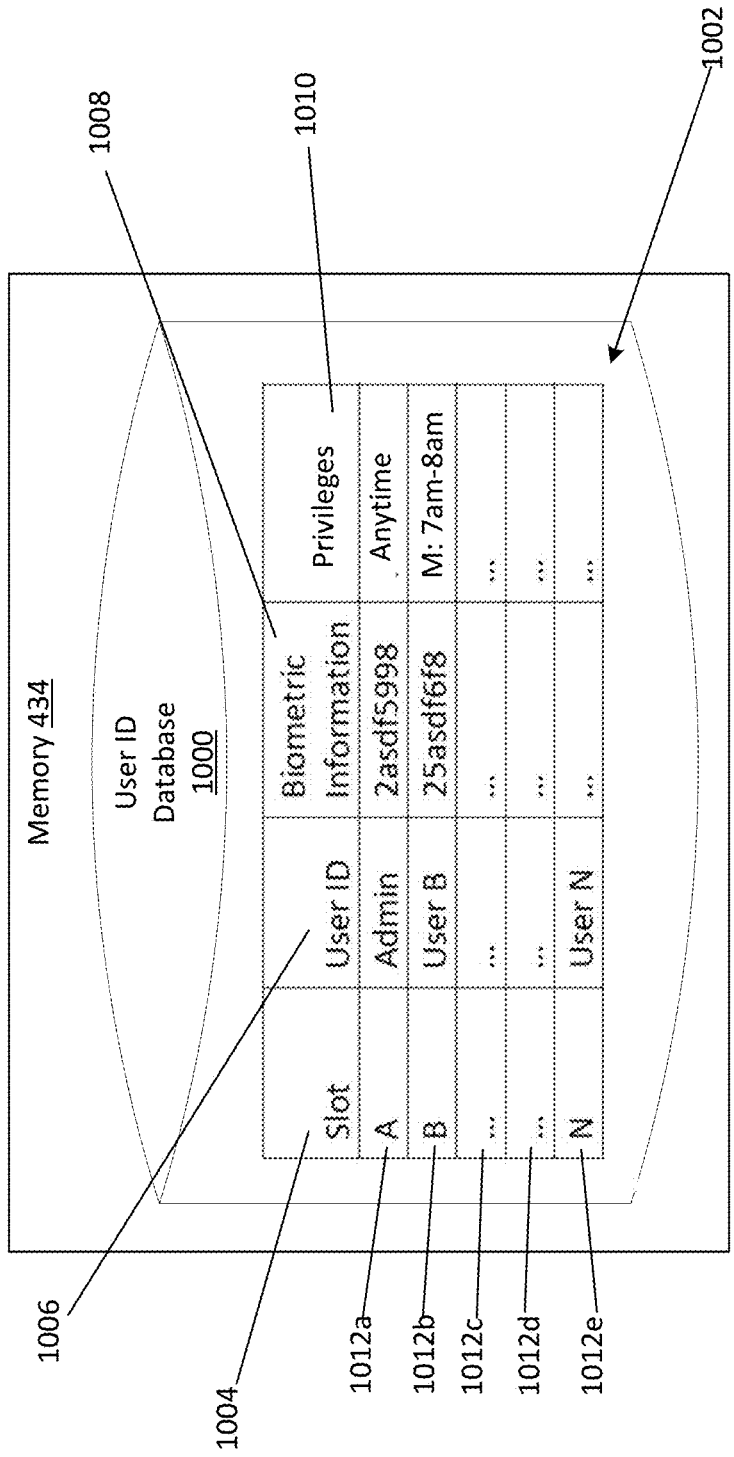
FIG. 10 is an example block diagram of a memory of the biometric lockset.

FIG. 10 illustrates an example memory 434 that may store a user ID database 1000 useful to store the received fingerprint data and to which user 18 the fingerprint data corresponds. The user ID database 1000 can also store privilege information, for each user 18, where privilege information determines when a user 18 is able to unlock the biometric lockset 200. For example, an administrative user 12 can unlock or lock the biometric lockset 200 at all times, but another user 18 may only be able to unlock or lock the biometric lockset 200 on Mondays between 7:00 am and 8:00 am. The memory 434 is maintained within the lockset 200, as noted above.

In the example shown, the user ID database 1000 maintains a table 1002 of information corresponding to known users 18 of the lockset. The user ID database 1000 includes a predetermined number of memory slots 1004, wherein each memory slot 1004 stores a set of information unique to an individual user 18. The memory 434, and specifically the user ID database 1000, is functional in a programming or enrollment mode and a comparison mode. In the programming mode, the set of information unique to an individual is capable of being edited by an administrative user 12 (e.g., by being accessed via a mobile device or synchronized with settings within a mobile application controlled by that administrative user 12). In the comparison mode, the user ID database 1000 is used to compare fingerprint data received at a biometric sensor with the information stored in the table 1002.

The table 1002 maintains information corresponding to individual users 18. The table 1002 includes multiple memory slots 1004, a user identification field 1006, biometric information 1008, and a privilege indication 1010 for each user 18. Each memory slot 1004 stores a set of information unique to an individual user 18. In the example shown, slots 1012a, 1012b, 1012c, 1012d, 1012e each correspond to a unique and individual user 18. The user identification field 1006 stores the identity of each user 18. The identity of each user 18 may correspond to a name, or other means of identification, such as "administration," or "user A."

The biometric information 1008 is unique to each individual user 18 and is stored in the table 1002, which is stored at the lockset 200. As described in the examples herein, biometric information 1008 is fingerprint data. However, in alternative embodiments, biometric information 1008 may be other data such as face recognition, iris recognition, retina recognition, or other similar data types.

The time at which a user 18 may unlock or lock the biometric lockset 200 is stored at privilege indication 1010. An administrative user 12 determines when users 18 are able to unlock and lock the biometric lockset 200. For example, an administrative user 12 can unlock or lock the biometric lockset 200 at all times, but another user 18 may only be able to unlock or lock the biometric lockset 200 on Mondays between 7:00 am and 8:00 am.

Figure 11:
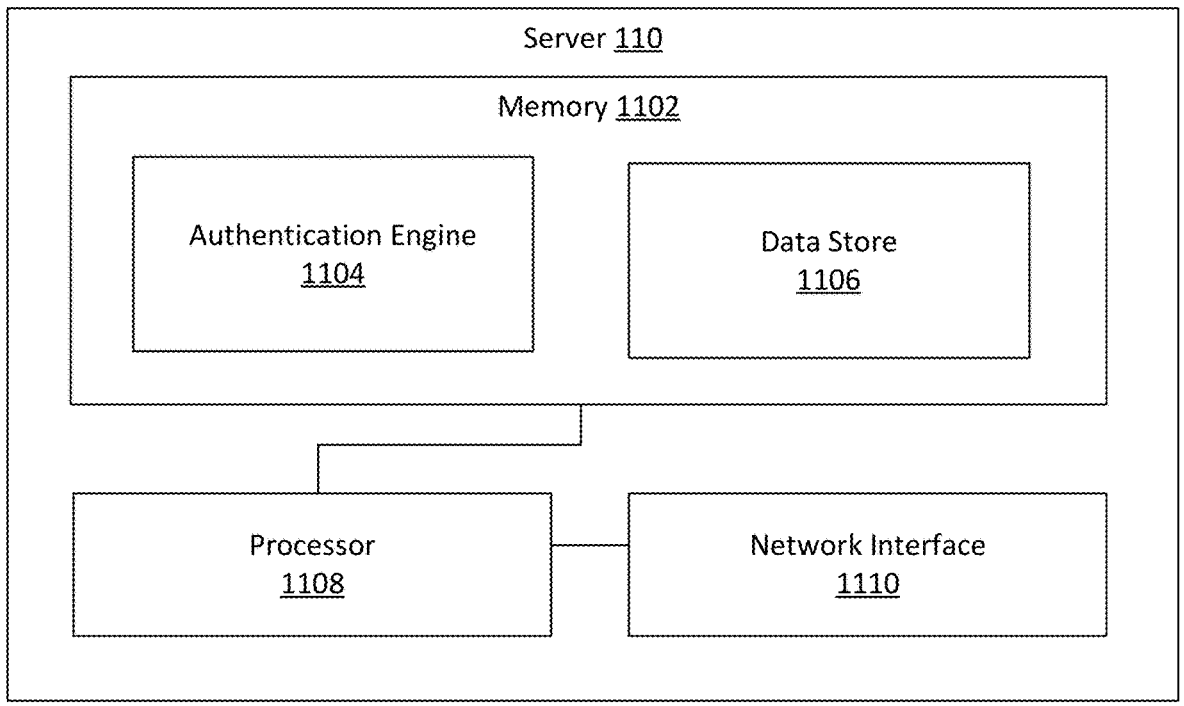
FIG. 11 illustrates a schematic representation of the server of FIG. 1.

FIG. 11 illustrates a schematic diagram of a server 110 usable in embodiments of the disclosure to complete an enrollment process of a biometric lockset 200. The server 110 can be owned and maintained by a manufacturer of the biometric lockset 200 that needs to be authenticated before use, or can be a virtual server provided by a cloud hosting service to such a manufacturer for use. The server 110 includes a memory 1102, a processor 1108, and a network interface 1110.

The memory 1102 includes an authentication engine 1104 and a data store 1106. The authentication engine 1104 operates to generate challenges, verify signature results, and send authentication results.

The data store 1106 functions to store information needed to authenticate the biometric lockset 200. This information can include account information for users 18 of biometric lockset 200. The account information can be gathered through input received at the mobile device 102, for example. The data store 1106 also stores keys used to sign challenges that are sent to biometric lockset 200 and to validate signatures received from the biometric lockset 200.

The processor 1108 operates to execute instructions stored on the memory 1102.

The network interface 1110 operates to establish connections to the biometric lockset 200 as well as mobile device 102 via a network connection such as Wi-Fi.

Figure 12:
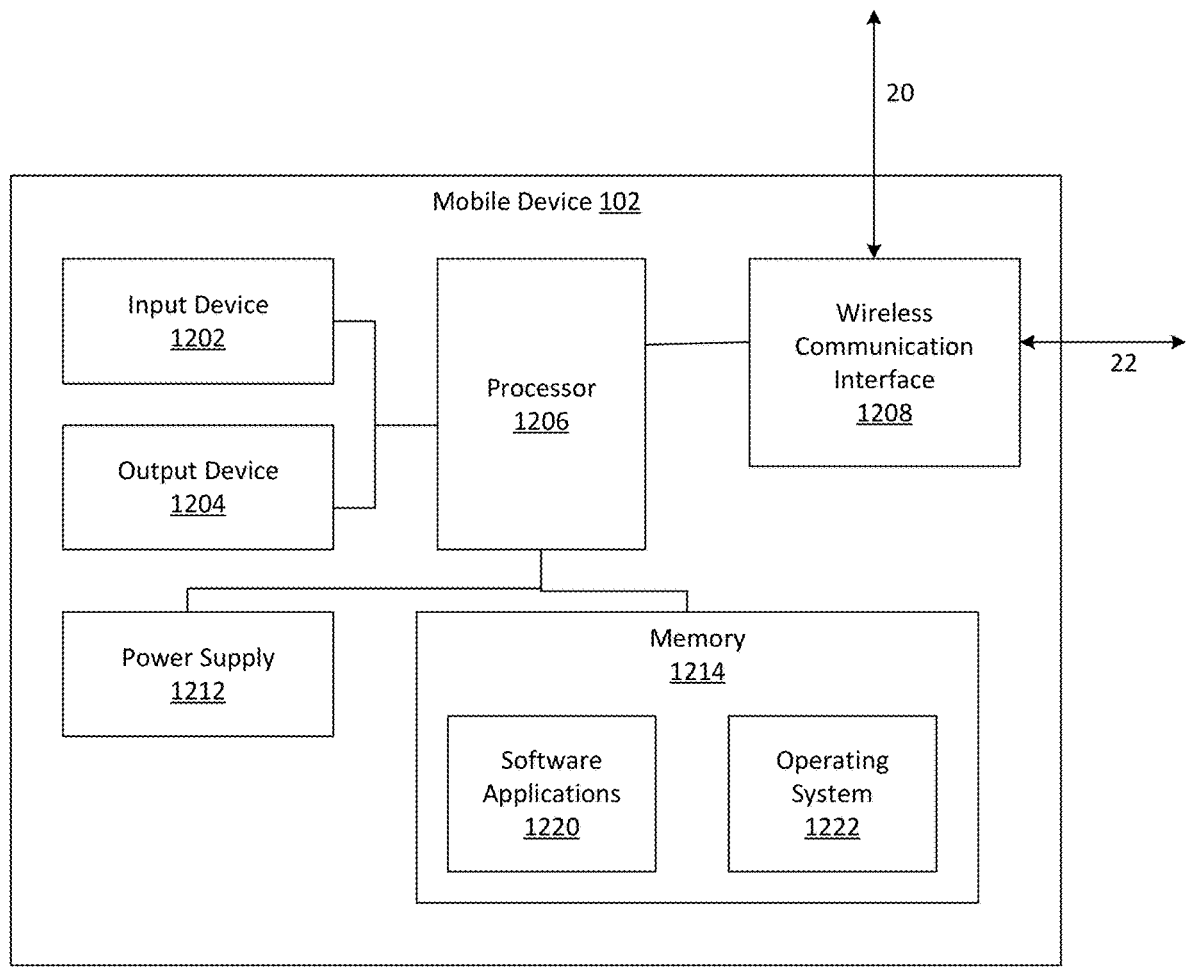
FIG. 12 illustrates a schematic representation of the mobile device of FIG. 1.

FIG. 12 illustrates a schematic diagram of a mobile device 102 usable in embodiments of the disclosure to enroll authorized users 18 at a biometric lockset 200 with a cloud server. In some embodiments, the mobile device 102 operates to form a Bluetooth or BLE connection with a network enabled security device such as an electronic lock. The mobile device 102 then communicates with a cloud server via a Wi-Fi or mobile data connection. The mobile device 102 thus operates to communicate information between the lock and the server. In other embodiments, the mobile device 102 is not required because the biometric lockset 200 is network enabled such that it can connect via Wi-Fi to the cloud server. The mobile device 102 shown in FIG. 12 includes an input device 1202, an output device 1204, a processor 1206, a wireless communication interface 1208, a power supply 1212, and a memory 1214.

The input device 1202 operates to receive input from external sources. Such sources can include inputs received from a user 18. The inputs can be received through a touchscreen, a stylus, a keyboard, etc.

The output device 1204 operates to provide output of information from the mobile device 102. For example, a display could output visual information while a speaker could output audio information.

The processor 1206 reads data and instructions. The data and instructions can be stored locally, received from an external source, or accessed from removable media.

The wireless communication interface 1208 is similar to the wireless communication interface 436. A wireless communication 22 connection can be established with the cloud server. A BLE connection 20 can be established with the biometric lockset 200.

The power supply 1212 provides power to the processor 1206.

The memory 1214 includes software applications 1220 and an operating system 1222. The memory 1214 contains data and instructions that are usable by the processor 1206 to implement various functions of the mobile device 102.

It is noted that in example embodiments, at least some portion of the database 1000 may be replicated on a user's mobile device, such as a mobile device 102 of an administrative user 12. In such examples, the memory 1214 may store a portion of the database 1000, such as the names and rules associated with user access at the lockset 200, but may not store the detailed biometric data that is captured and stored at the lockset. This strengthens security of the biometric data (ensuring that the biometric data is not compromised if the mobile device 102 is lost, hacked, or stolen).

The software applications 1220 can include applications usable to perform various functions on the mobile device 102. One such application is an application configured to enable enrollment of users 18 of the lockset 200. The application can operate to access and control devices that are connected to the mobile device 102 through a network.

Although this disclosure describes these features as implemented on a deadbolt for purposes of example, these features are applicable to any type of lockset, including but not limited to, deadbolts, knob set locks, handle set locks, etc.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Illustrative examples of the biometric lockset disclosed herein are provided below. An embodiment of the biometric lockset may include any one or more, and any combination of, the examples described below.

In Example 1, a method of enrolling a user at a biometric lockset comprises receiving user access information from a mobile device of an administrative user of the biometric lockset, the user access information indicating to the biometric lockset to enter an enrollment mode in which a user identity is associated with fingerprint data in a user entry within a memory of the biometric lockset. The method further includes entering the enrollment mode, displaying a first light code indicative of an initial state of fingerprint data capture, receiving a first fingerprint touch, and transmitting a first message via a wireless communication protocol to the mobile device, the first message corresponding to the first light code. After receiving the first fingerprint touch, the method further includes displaying a second light code, the second light code being different than the first light code and indicative of an intermediate state of fingerprint data capture different from the initial state. The method then includes transmitting a second message via the wireless communication protocol to the mobile device, the second message corresponding to the second light code; receiving at least a second fingerprint touch; and displaying a third light code, the third light code being different than the first light code and the second light code, and the third light code being indicative of completed fingerprint data capture for the particular fingerprint of the user. The method further includes transmitting a third message via the wireless communication protocol to the mobile device, the third message corresponding to the third light code, and storing a completed fingerprint data in association with the user identity of the user in the user entry.

In Example 2, the method of Example 1 is modified to further include determining whether the first fingerprint touch is a complete representation of the particular fingerprint. Displaying the second light code is based on a determination that the first fingerprint touch is an incomplete representation of the particular fingerprint.

In Example 3, the method of Example 2 is modified in that the message corresponding to the third light code is a message indicative of a completed enrollment process of the user.

In Example 4, the method of Example 1 is modified in that, in the enrollment mode, the biometric lockset determines that the mobile device is located exterior to a door.

In Example 5, the method of Example 1 is modified in that the biometric lockset is configured to communicate with an application executable on the mobile device, and the application is configured to generate a user interface presentable to the administrative user.

In Example 6, the method of Example 1 is modified in that the wireless communication protocol is selected from Bluetooth, WiFi, Zigbee, Z-wave, a wireless local area network, and a near-field communication protocol.

In Example 7, the method of Example 1 is modified in that each user entry further includes a time limit that indicates when the user is authorized to actuate the biometric lockset.

In Example 8, the method of Example 7 is modified in that the time limit is any time, a specific date, a specific day of a week, or an hourly time limit.

In Example 9, the method of Example 1 is modified in that the memory stores a plurality of user entries, and the method further includes editing at least one user entry of the plurality of user entries stored in the memory of the biometric lockset by performing one of (1) deleting the at least one user entry or (2) changing a time limit that indicates when the user is authorized to actuate the biometric lockset.

In Example 10, the method of Example 1 is modified in that, after storing the fingerprint data with the user identity in the user entry, the processor exits the enrollment mode and enters an operative mode.

In Example 11, a biometric lockset comprises a processor, a battery, a memory communicatively connected to the processor, a light communication unit, a wireless communication interface, and a locking bolt movable between a locked position and an unlocked position. The biometric lockset also comprises a motor actuatable by the processor to move the locking bolt between the locked and unlocked positions, and a fingerprint sensor communicatively connected to the processor and configured to receive fingerprint data. The processor is configured to execute instructions stored in the memory, the instructions causing the processor to perform: entering an enrollment mode, displaying a first light code indicative of an initial state of fingerprint data capture, receiving a first fingerprint touch, displaying a second light code different from the first light code that is indicative of an intermediate state of fingerprint data capture different from the initial state, and transmitting an enrollment status message via the wireless communication interface to the mobile device, the enrollment status message corresponding to the second light code. Upon completion of capturing the fingerprint data, the processor is configured to perform storing a fingerprint representation based on the fingerprint data with the user identity in a user entry.

In Example 12, the biometric lockset of Example 11 is modified in that the processor is further configured to determine whether the first fingerprint touch is a complete representation of a fingerprint, and based on a determination that the first fingerprint touch is an incomplete representation, display the second light code.

In Example 13, the biometric lockset of Example 11 is modified in that the processor is further configured to receive at least a second fingerprint touch. Based on a determination that the first fingerprint touch and the at least second fingerprint touch form a complete representation of a fingerprint, the processor is further configured to display a third light code, the third light code being different than the first light code and the second light code and indicating completed fingerprint data capture. The processor is further configured to transmit a completion message via the wireless communication interface to the mobile device, the message corresponding to the third light code, and store the fingerprint representation with the user identity in the user entry.

In Example 14, the biometric lockset of Example 11 is modified in that the memory comprises a predetermined number of memory slots, each memory slot configured to store a user name, the fingerprint representation, and a user type.

In Example 15, the biometric lockset of Example 11 is modified in that the light communication unit comprises a plurality of LEDs arranged in a line.

In Example 16, a system comprises an application installed on a mobile device having a wireless communication interface and a display, and a biometric lockset. The biometric lockset comprises a processor, a battery, a memory communicatively connected to the processor, a light communication unit, a wireless communication interface, and a locking bolt movable between a locked position and an unlocked position, a motor actuatable by the processor to move the locking bolt between the locked and unlocked positions, and a fingerprint sensor communicatively connected to the processor and configured to receive fingerprint data. The processor is configured to execute instructions stored in the memory, and the instructions cause the processor to perform: receiving an indication from the mobile device and causing the lockset to enter into an enrollment mode, displaying a first light code on the light communication unit and transmitting a first message to the application, the first message corresponding to the first light code, and displaying a second light code on the light communication unit and transmitting a second message to the application, the second message corresponding to the second light code, and the second light code being different than the first light code. The processor is further configured to perform storing a fingerprint representation in the memory based on the fingerprint data and stored in association with the user identity in a user entry.

In Example 17, the system of Example 16 is modified in that the application is further configured to cause the mobile device to display, on the mobile device display, a user enrollment status in response to receipt of the first message at the mobile device.

In Example 18, the system of Example 17 is modified in that display of the first light code on the light communication unit and display of the first message on the mobile device display occur concurrently.

In Example 19, the system of Example 16 is modified in that the second light code and the second message correspond to an incomplete fingerprint representation.

In Example 20, the system of Example 16 is modified in that the processor is further configured to display a third light code on the light communication unit, and transmit a third message to the application when the fingerprint data capture is a complete fingerprint representation, the third message corresponding to the third light code.

In Example 21, a method of enrolling a user at a biometric lockset comprises sending, from an application, a notification to a lockset to enter an enrollment mode, the application being associated with an administrative user and executable on a mobile device wirelessly connected to the lockset. The method further includes receiving, from the biometric lockset, a notification that a first fingerprint touch is received; displaying a first message on a display of the mobile device, the first message corresponding to receiving the first fingerprint touch; and receiving, from the biometric lockset, a notification that a second fingerprint touch is received. The method further includes displaying a second message on the display of the mobile device, the second message corresponding to receiving the second fingerprint touch. The second message is different than the first message. The method further includes storing a user identity and an indication that a completed fingerprint data is received at a server accessible by the application.

In Example 22, the method of Example 21 is modified in that the first message indicates an intermediate state of receiving fingerprint data.

In Example 23, the method of Example 21 is modified in that the second message indicates a completed state of receiving fingerprint data.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A method of enrolling a user at a biometric lockset, the method comprising:
   receiving user access information from a mobile device of the user of the biometric lockset, the user access information indicating to the biometric lockset to enter an enrollment mode in which a user identity is associated with fingerprint data in a user entry within a memory of the biometric lockset;
   entering the enrollment mode;
   displaying a light code indicative of the biometric lockset being in the enrollment mode;
   receiving an initial fingerprint touch;
   transmitting an initial message via a wireless communication protocol to the mobile device, the initial message corresponding to the initial fingerprint touch;
   receiving an intermediate fingerprint touch;
   transmitting an intermediate message via the wireless communication protocol to the mobile device, the intermediate message corresponding to the intermediate fingerprint touch;
   receiving a final fingerprint touch;
   transmitting a final message via the wireless communication protocol to the mobile device, the final message corresponding to the final fingerprint touch; and
   storing a completed fingerprint data in association with the user identity of the user in the user entry.

2. The method of claim 1, further comprising determining whether the initial fingerprint touch is a complete representation of a particular fingerprint of the user.

3. The method of claim 1, wherein the final message is a message indicative of a completed enrollment process of the user.

4. The method of claim 1, wherein in the enrollment mode, the biometric lockset determines that the mobile device is located exterior to a door.

5. The method of claim 1, wherein the biometric lockset is configured to communicate with an application executable on the mobile device, wherein the application is configured to generate a user interface presentable to the user.

6. The method of claim 5, wherein the user interface displays a progress status for the enrollment mode.

7. The method of claim 1, wherein the wireless communication protocol is selected from Bluetooth, Wi-Fi, Zigbee, Z-wave, a wireless local area network, and a near-field communication protocol.

8. The method of claim 1, wherein each user entry further includes a time limit that indicates when the user is authorized to actuate the biometric lockset.

9. The method of claim 8, wherein the time limit is any time, a specific date, a specific day of a week, or an hourly time limit.

10. The method of claim 1, wherein the memory stores a plurality of user entries, the method further including:
   editing at least one user entry of the plurality of user entries stored in the memory of the biometric lockset by performing one of (1) deleting the at least one user entry or (2) changing a time limit that indicates when the user is authorized to actuate the biometric lockset.

11. The method of claim 1, wherein after storing the fingerprint data with the user identity in the user entry, the biometric lockset exits the enrollment mode and enters an operative mode.

12. The method of claim 1, wherein the light code is presented via a light communication unit comprising one or more LED lights.

13. A biometric lockset comprising:
   a processor;
   a battery;
   a memory communicatively connected to the processor;
   a light communication unit;
   a wireless communication interface;
   a locking bolt movable between a locked position and an unlocked position;
   a motor actuatable by the processor to move the locking bolt between the locked and unlocked positions; and
   a fingerprint sensor communicatively connected to the processor and configured to receive fingerprint data;
   wherein the processor is configured to execute instructions stored in the memory, the instructions causing the processor to:
      enter an enrollment mode in response to receiving a notification from a mobile device via the wireless communication interface;
      display, via the light communication unit, a light code indicative of the biometric lockset being in the enrollment mode;
      receive a first fingerprint touch;
      transmit a first enrollment status message via the wireless communication interface to the mobile device, the first enrollment status message corresponding to the first fingerprint touch;
      receive a second fingerprint touch;
      transmit a second enrollment status message via the wireless communication interface to the mobile device, the second enrollment status message corresponding to the second fingerprint touch; and
      upon completion of capturing the fingerprint data, store a fingerprint representation based on the fingerprint data with a user identity in a user entry.

14. The biometric lockset of claim 13, wherein the processor is further configured to:
   determine whether the first fingerprint touch is a complete representation of a fingerprint.

15. The biometric lockset of claim 13, wherein the processor is further configured to:
   receive a third fingerprint touch; and
   based on a determination that at least the first fingerprint touch, the second fingerprint touch, and the third fingerprint touch form a complete representation of a fingerprint:
      transmit a completion message via the wireless communication interface to the mobile device; and
      store the complete representation of the fingerprint with the user identity in the user entry.

16. The biometric lockset of claim 13, wherein the memory comprises a predetermined number of memory slots, each memory slot configured to store a user name, the fingerprint representation, and a user type.

17. The biometric lockset of claim 13, wherein the light communication unit comprises at least one LED light.

18. A non-transitory computer readable storage device including computer readable instructions that, when executed by at least one processing unit, are configured to cause the at least one processing unit to perform a method of enrolling a user at a biometric lockset, the method comprising:
   sending, from an application, a first notification to the biometric lockset to enter an enrollment mode, the application being associated with an administrative user and executable on a mobile device wirelessly connected to the biometric lockset;
   receiving, from the biometric lockset, a second notification that a first fingerprint touch is received;
   displaying a first message on a display of the mobile device, the first message corresponding to receiving the first fingerprint touch;
   receiving, from the biometric lockset, a third notification that a second fingerprint touch is received;
   displaying a second message on the display of the mobile device, the second message corresponding to receiving the second fingerprint touch, wherein the second message is different than the first message; and
   displaying a user identity and an indication that a completed fingerprint data is received on the display of the mobile device.

19. The non-transitory computer readable storage device of claim 18, wherein the first message indicates an intermediate state of receiving fingerprint data.

20. The non-transitory computer readable storage device of claim 18, wherein the second message indicates a completed state of receiving fingerprint data.

* * * * *